Nov. 28, 1939.  C. DE GANAHL ET AL  2,181,562
FLUID ACTUATED OPERATING MECHANISM
Filed March 19, 1938   2 Sheets-Sheet 1
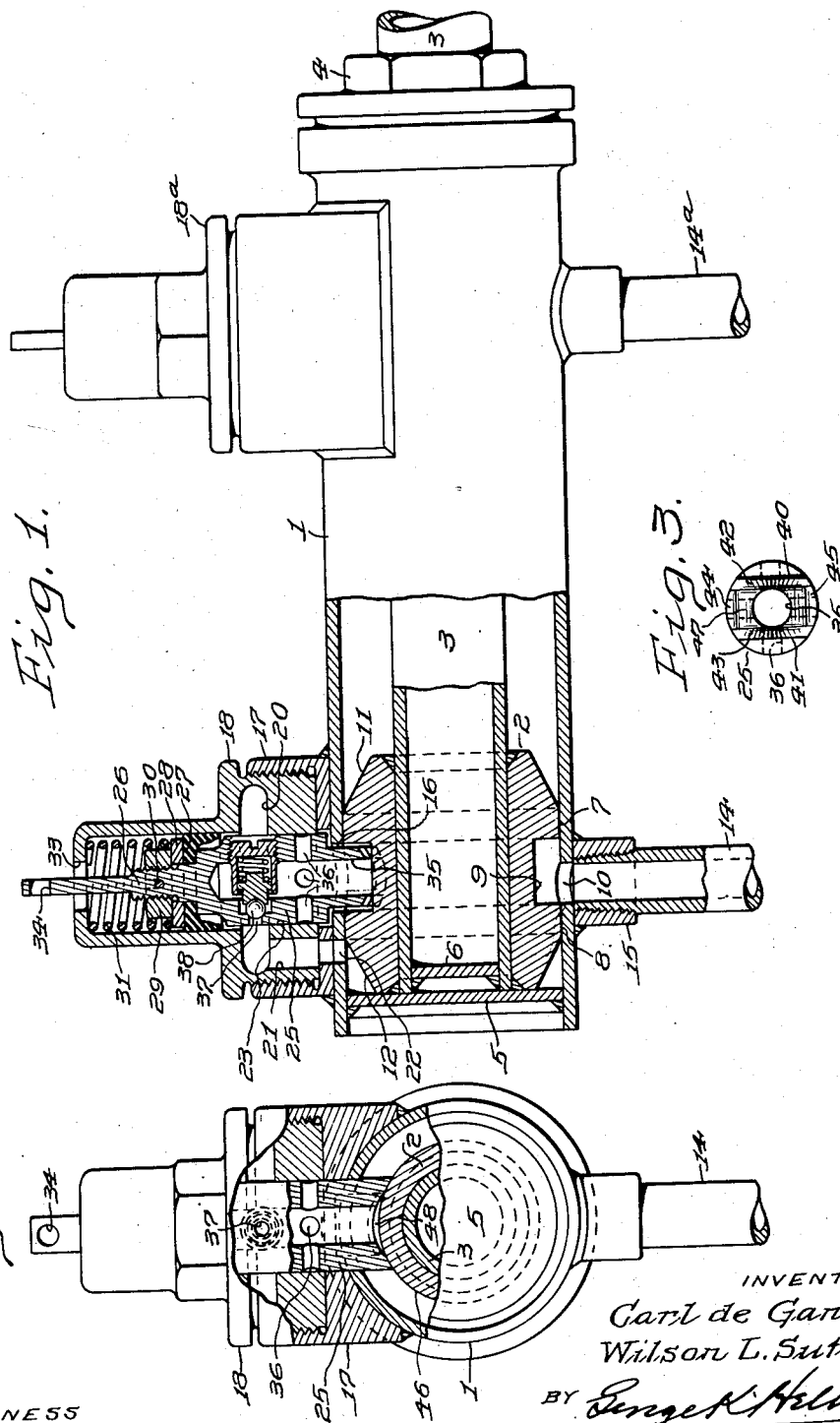
INVENTORS
Carl de Ganahl,
Wilson L. Sutton.
BY
ATTORNEY
WITNESS
F. J. Hartman.

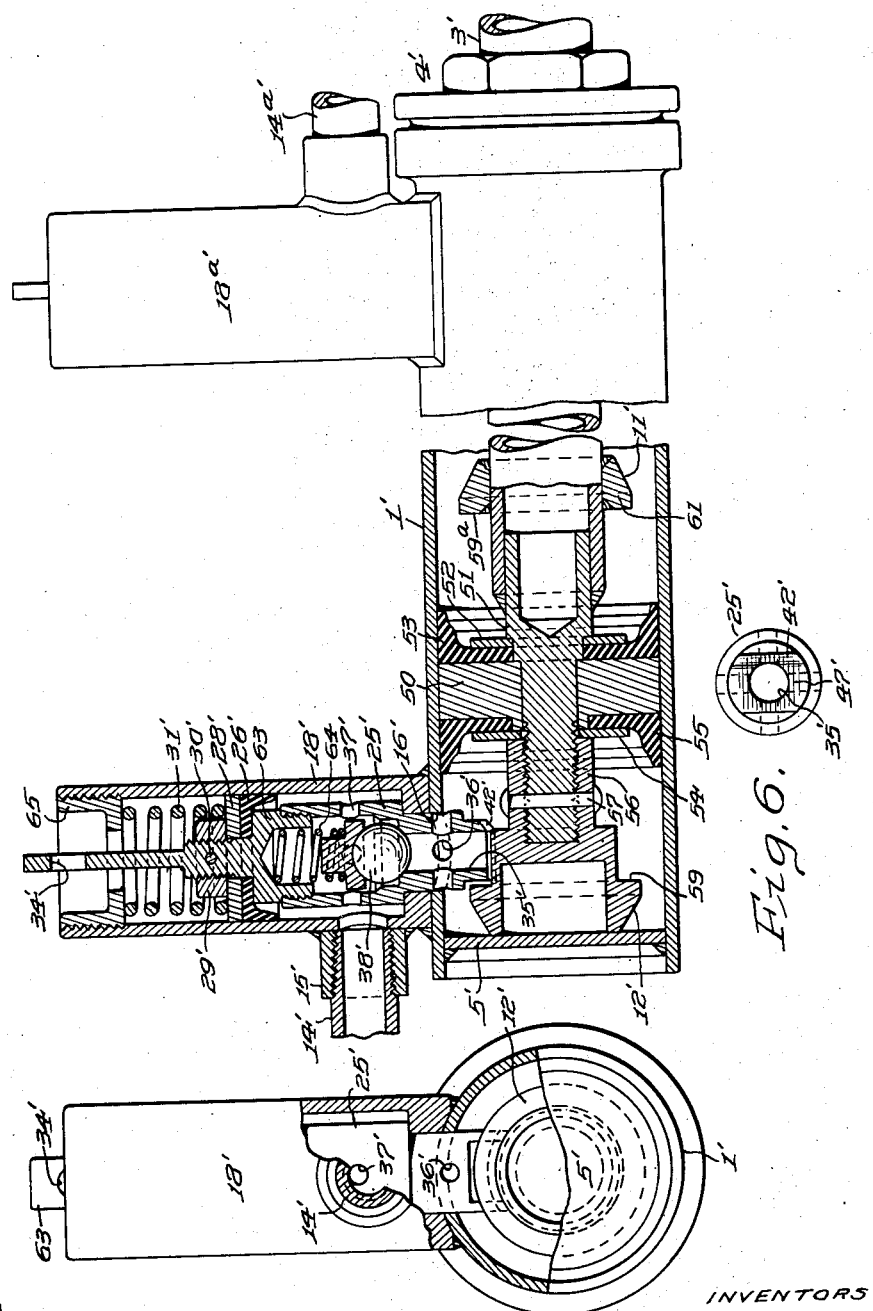

Patented Nov. 28, 1939

2,181,562

UNITED STATES PATENT OFFICE 2,181,562

FLUID ACTUATED OPERATING MECHANISM

Carl de Ganahl and Wilson L. Sutton, Bristol, Pa., assignors to Fleetwings, Inc., Bristol, Pa., a corporation of Delaware Application March 19, 1938, Serial No. 197,043

11 Claims. (Cl. 121—40)

This invention relates to fluid actuated means for operating mechanical elements and is particularly directed to providing, in combination with a fluid actuated reciprocating piston, improved latching mechanism whereby the piston is automatically restrained from movement after completion of its travel in one direction until automatically released by fluid under pressure just prior to exertion of pressure by said fluid against the piston for moving it in the opposite direction.

Mechanism embodying the invention is of particular utility in modern aircraft, due to the present trend toward increasing use of fluid actuated means for operating retractable landing gears and tail wheels on land planes and water rudders on sea planes, and landing flaps, folding wings, and other moving parts on aircraft generally, as it can readily be made of lightweight construction with substantially perfect mechanical reliability, and instantaneously responsive to its controlling fluid pressure; it may, however, be utilized in substantially any situation in which limited rectilinear mechanical motion of positive character with positive automatic latching at the limits of such motion is desired.

We are aware that mechanism intended for this same general purpose has heretofore been suggested, including in combination with a cylinder and a fluid actuated piston therein, a fluid actuated piston latch adapted to engage the piston at each limit of its travel to prevent its reverse movement, except when positively driven by its controlling fluid; the prior devices with which we are familiar, however, provide direct connection between the latch operating cylinder and the main cylinder, whereby the fluid pressure in both cylinders is at all times substantially equalized so that as the pressure in the main cylinder reacts against the piston, the latter in turn bears against the latch prior to its release therefrom, causing excessive wear on the parts and delaying or even sometimes inhibiting proper operation of the latch actuating piston in its cylinder.

In accordance with the present invention, however, the latch is withdrawn from the position in which it prevents movement of the main piston before the actuating fluid, usually brake fluid or other suitable non-compressible liquid, can act against the latter in such way as to cause it to bear heavily against the latch or hinder its normal operation. Rapid, positive, and efficient operation of the piston and the mechanical elements actuated thereby is thus readily effected without excessive wear on any of the parts.

It is therefore the principal object of the invention to provide in combination with a cylinder and fluid actuated piston therein, means controlled by the fluid pressure used to actuate the piston to automatically lock the latter against further movement on completion of its travel in one direction, and adapted under the influence of said fluid pressure to automatically unlatch the piston and thereby free it for movement in the opposite direction just prior to the initiation of such movement.

A further object is to provide in mechanism of this character a fluid actuated piston latch and fluid actuated operating means therefor which, while normally keeping the piston latched against movement in its cylinder, responds to the pressure of the fluid used for moving the piston to automatically and substantially instantaneously free the latter for movement in response to said fluid pressure and which offers no material resistance to return movement of the piston in the opposite direction, at the completion of which it is again automatically latched thereby.

Other objects, purposes and advantages of the invention will hereafter appear or will be understood from the following description of a preferred embodiment thereof, and also a modified embodiment which may in some cases be preferred, as illustrated in the accompanying drawings in which:

Fig. 1 is a side elevation partially in vertical section of said preferred embodiment of the invention;

Fig. 2 is an end elevation thereof partly broken away into vertical section;

Fig. 3 is a detail end view of the lower face of the latching element included in the mechanism so illustrated, and Figs. 4, 5 and 6 are views corresponding to the preceding figures but showing the said modified embodiment.

In the several figures like characters are used to designate the same parts.

Referring first to Figs. 1-3 inclusive, in which the details of construction of certain parts at one end only of the cylinder 1 are illustrated and hereinafter more fully described, it will be understood that substantially similar parts are usually positioned at the opposite end of the cylinder which is of course suitably fixed to a rigid support (not shown) in any convenient way, but the piston latching mechanism at either end may be omitted when the piston 2 is to be used in such way that its automatic latching at the adjacent limit of its travel in the cylinder is not desired. The piston 2 is carried by, and actuates, a piston rod 3 extending outwardly from one end of the cylinder through a gland 4 for connection with mechanism (not shown) to be operated thereby. The other end of the cylinder is closed by a head 5 conveniently welded in place, although of course the piston rod may be extended beyond both ends of the cylinder if desired, and in that case a gland 4 is provided at each end. The piston rod 3 if of tubular construction to avoid unnecessary weight has its end adjacent which the piston is attached closed by a head 6 when the rod is not extended through both ends of the cylinder.

The piston 2 has two spaced cylindrical sealing surfaces 7 and 8 lapped into the cylinder in a fluid-tight but sliding fit, or, if desired, piston rings or other suitable sealing elements may readily be supplied and similarly spaced, the sealed areas being separated by an annular groove 9, which is desirably of slightly greater width than the diameter of a fluid inlet port 10 in the wall of the cylinder, and the ends of the piston beyond the seals 7 and 8 are chamfered off to form tapered surfaces 11, 12 for a purpose which will hereinafter appear. The relation of groove 9 and port 10 is such that when the piston is at the adjacent limit of its travel the groove is aligned with the port which is connected through a conduit 14 threaded into a boss 15 welded or otherwise secured to the outside of the cylinder in registry with port 10 with a source of fluid under pressure, controlled by a suitable valve for selectively admitting and relieving fluid pressure in the conduit.

Preferably diametrically opposite port 10, but in any case in substantially the same axial plane, is an opening 16 in the cylinder wall which, outside the cylinder, is surrounded by an internally threaded boss 17 carrying an externally threaded hollow cap 18 enclosing the major portion of piston latching mechanism. The cap 18 has an annular groove 20 in the cylindrical bore in its interior, connected by a passage 21 with a hole 22 in the cylinder wall located closely adjacent to head 5. The bore 23 in the cap is of slightly larger diameter above this groove than that portion thereof between groove 20 and the cylinder, the latter portion forming a tightly fitting bearing for a latch 25 which can thus move axially therein while preventing the flow of the actuating fluid through the bore between the cylinder and groove past the latch, although the fluid can flow past the latch above groove 20 due to the larger diameter of the cap bore in this region.

The shank 26 of the latch carries a piston washer 27 which may be made of synthetic rubber or any other suitable material providing a fluid-tight sliding seal with the upper enlarged portion of the cap bore, this washer being held on the shank by a backing-up washer 28 and a castellated nut 29 and secured by a cotter pin 30. Above the washer the shank is surrounded by a spring 31 and beyond its threaded portion is of rectangular section and extends outwardly through a suitable hole 33 in the closed end of the cap, a hole 34 being preferably provided in the extremity of the shank to facilitate connection of means for manually releasing the latch, thus enabling the mechanism when connected with retractable landing gears and the like to be manually operated and thereby conform to modern safety standards for aircraft.

The inner end of latch 25, which is lapped in the inner end of bore 23 of cap 18, has an axial bore 35 from which extend a plurality of small radial passages 36 lying in a single plane and an additional radial passage 37 more remote from the inner end of the latch; this passage 37 is aligned with groove 20 in the cap when the latch is in the position shown in Fig. 1 and is fitted with a check valve 38 of any convenient construction adapted to permit the flow of fluid through passage 37 from the groove 20 to bore 35, but to prevent such flow in the opposite direction.

The latch is, of course, cylindrical in that portion thereof which is lapped in bore 23 but adjacent its lower or inner end it is rabbeted out on its opposite sides to provide flat faces 40, 41 whereby, through engagement with the edges of opening 16 in the cylinder, it is prevented from turning about its axis. The end face of the latch shown in detail in Fig. 3 has two beveled surfaces 42, 43 substantially conforming to tapers 11, 12 on the piston, small cylindrical edge segments 44, 45, which generally conform to the cylindrical surface 46 at the bottom of piston groove 9, and a cylindrical surface 47, interrupted by the end of bore 35, extending between the inner edges of bevels 42, 43 and drawn on a smaller radius than the bottom surface 46 in said groove so that when the latch is in the position shown in Figs. 1 and 2, with segments 44, 45 resting on the bottom of the groove, there is a clearance 48 between surfaces 46, 47.

*Operation*

The operation of this embodiment of the invention will be described with particular reference to the latching and unlatching of the piston when it is at the left hand end of the cylinder in Fig. 1, and it will be understood that substantially similar operations take place at the opposite end of the cylinder during corresponding portions of the operating cycle when the piston is at that end. Thus, when piston 2 is in the said position with latch 25 resting in groove 9 and held therein by the pressure of spring 31, the piston obviously cannot be moved mechanically, due to the engagement of the latch in the groove. However, when the piston is to be moved to the other end of the cylinder by fluid pressure, the control valve is operated to admit actuating fluid under pressure through conduit 14 and port 10 into groove 9.

Due to the tight fit the sealing surfaces 7, 8 of the piston makes with the cylinder walls, no fluid can escape into other portions of the cylinder in either direction from groove 9 so long as the piston remains in this position, and there is consequently no initial reaction of the fluid against the piston tending to move it in the cylinder. The fluid pressure in groove 9 resulting from operation of the control valve is immediately transmitted through clearance 48 into bore 35 in the latch however and through the clearance between the latter and port 16 in which the end of the latch fits only loosely but cannot flow between the cap bore and the latch into groove 20, due to the tight fit of the latch, while the check valve 38 inhibits flow of fluid through passage 37 from bore 35; the fluid pressure therefore reacts against the latch to move it outwardly from the piston against the force of spring 31 until passages 36 are brought into communication with groove 20. These passages are so positioned in the latch with relation to other parts of the mechanism that the lower end of the latch has moved substantially out of the path of adjacent surface 8 of the piston as passages 36 begin to register with groove 20, and as the latter is connected through passage 21 and hole 22 with the cylinder between its head 5 and the adjacent sealing surface 8 of the piston, the actuating fluid can then flow from port 10 through groove 9, bore 35, passages 36, groove 20, passage 21 and hole 22 into the cylinder between the piston and the adjacent cylinder head to move the piston toward the right. In case the latch has not entirely cleared the piston when the latter starts to move, the shoulder formed between groove 9 and the sealing surface 8 of the piston engages the bevel 43 of the latch and slightly raises the latter during subsequent movement of the piston until the groove is cleared from the latch.

As noted, the diameter of port 10 is greater than the width of surface 8, so the former is not entirely closed during the movement of the latter past it and, of course, after said surface has cleared this port, the actuating fluid can flow directly into the cylinder back of the piston and move it throughout the remainder of its stroke.

When the piston reaches the opposite end of the cylinder, the latching mechanism associated with the cap 18a, which is substantially similar to that associated with cap 18, operates automatically to hold it in that position until introduction of fluid pressure through conduit 14a brings about a reversal through the operation of the latching mechanism at that end in the manner just described. This automatic latching of the piston in position can most easily be explained by reference to return of the piston toward the position shown in Fig. 1, the operation being the same at both ends of the cylinder except, of course, that the direction of movement of the piston toward latched position is different. Thus it will be understood that after the piston has been moved to either of its extreme positions, normal operation of the control valve or valves relieves the operating pressure in the fluid conduits through which the fluid under pressure was previously flowing to move the piston, and spring 31 therefore returns latch 25 to a lowered position similar to the one indicated in Fig. 1, against the relatively slight back pressure in the system prior to initiation of movement of the piston in the opposite direction.

Thereafter, when the piston moves from right to left toward the position shown in Fig. 1 under the influence of pressure admitted through conduit 14a, only the back pressure of the system resists discharge of displaced fluid through port 10, at least until the surface 8 has passed beyond this port, and as the piston moves into engagement with bevel 42 on the latch, the tapered surface 12 on the latter raises the latch and allows the piston to slide under it. As surface 8 passes beyond port 10 to its extreme limit, however, the displaced fluid can no longer be discharged directly through this port. The mechanism within cap 18 therefore again comes into play during this final movement of the piston to permit the discharge of displaced fluid from the cylinder between surface 8 and the adjacent cylinder head after said surface has passed the port.

Thus while latch 25 is raised, due to engagement of the piston with its lower end during movement toward the head 4, passages 36 are aligned with groove 20 and the fluid pressure back of the piston is therefore initially relieved through hole 22, passage 21, groove 20, passages 36, bore 35 and groove 9 in the piston which is now in communication with port 10.

When the piston reaches the full limit of its travel, the shoulder formed between groove 9 and surface 8 passes under the edge of the latch, however, and the latter is no longer held up by the piston against the force of its spring 31. This spring therefore immediately urges the latch toward locking position, but as the latch moves toward this position it removes passages 36 from communication with groove 20 so the fluid displaced by washer 26 during this movement can no longer escape through these passages. Passage 37, in which check valve 38 prevented movement of fluid from within the latch outwardly from bore 35, nevertheless provides an escape for the fluid in the opposite direction so that the fluid displacement resulting from the further inward movement of the latch to full latching position is relieved through this passage which communicates through bore 35 and groove 9 with port 10, and the mechanism is thus fully restored to condition to be operated again in the manner herein described.

The embodiment of the invention illustrated in Figs. 4–6, inclusive, performs the same functions as that shown in the preceding figures but is somewhat differently constructed and, being somewhat less compact, is ordinarily not so desirable for use in operating mechanism requiring only a relatively short stroke in its actuating piston. Thus, cylinder 1', which is substantially similar to cylinder 1, encloses a piston rod 3' extending through a gland 4' in one end of the cylinder, the opposite end of the latter being closed by a head 5' when a through piston rod is not employed. The piston carried by rod 3' is a composite one made up of several parts and as shown in Fig. 4 comprises a disc 50 carried on a stud 51 fitted into the end of piston rod 3', the stud providing between disc 50 and the adjacent end of the piston rod a shoulder engaging a plate 52 which with disc 50 embraces a piston washer 53 of synthetic rubber or other suitable material, while on the opposite side of the disc a plate 54 holds another piston washer 55 in position through the cooperation of a sleeve 56 threaded on the stud and locked in position by a headed-over pin 57, the outer and somewhat enlarged end of sleeve 56 being provided with a taper 12' and a face 59 extending normal to the cylinder axis. On the opposite side of the piston, which is thus composed of the two piston washers and disc 50, the piston rod carries a ring 61 preferably welded to the rod provided with a tapered face 11' and a face 59a parallel to face 59, these faces on sleeve 56 and ring 61 respectively corresponding in function to the parallel side walls of groove 9 of piston 2 in the embodiment of the invention previously described. Thus, when the piston is at the left hand extremity of its travel in Fig. 4, face 59 lies between latch 25' and the adjacent cylinder head to prevent movement of the piston away from this position during engagement of the latch therewith, while face 59a on the ring performs a substantially similar function in connection with the corresponding latch mounted at the opposite end of the cylinder when the piston is at the right hand extremity of its travel.

Latch 25' is mounted for a reciprocating motion radially of the cylinder axis in a cylindrical sleeve 18' welded to the cylinder wall and communicating therewith through a bore 16' in which the lower portion of the latch is preferably lapped to provide a fluid-tight sliding joint. A fluid conduit 14' is connected to sleeve 18' by a threaded boss 15' on its side and provides for the flow of fluid to and from the sleeve through port 10' therein.

The lower face of the latch, as best shown in Fig. 6, has a bevel 42' at the right hand edge of its cylindrical surface 41' for engagement with taper 12' on the end of piston sleeve 56; bore 35' in the latch is closed to the flow of fluid in one direction by a check valve 38' and radial fluid passages 36', 37' in the latch are disposed respectively below and above this check valve.

The shank of the latch, in this case a separate part 63 threaded into the body of the latch proper, provides an abutment for spring 64 of the check valve and carries a synthetic rubber or other suitable piston washer 26' secured by a rigid washer 28' and nut 29' locked in place by a cotter pin 30', one end of the latch actuating spring 31' bearing against washer 28' and its other end against a head 65 secured in sleeve 18' and provided with an opening through which the rectangular section upper end of shank 63 extends, hole 34' in the latter providing for attachment of a manual release.

When the several parts of this mechanism are in the positions shown in Fig. 4 and it is desired to move the piston toward the right, the control valve (not shown) is operated to admit fluid pressure through conduit 14' and port 10' into sleeve 18', the pressure in the other conduit 14a' of course being relieved. The pressure admitted through port 10' initially reacts against piston washer 26' to raise the latch, being prevented by check valve 38' from being transmitted through passages 37' into that part of bore 35' beneath the valve and by the close fit of the latch in bore 16' from passing through the latter into the cylinder. The latch is therefore lifted under the influence of this pressure and, as its lower end moves out of the path of face 59, passages 36' pass beyond the upper edge of bore 16' and into registry with the enlarged interior of sleeve 18'. The actuating fluid therefore flows through these passages and latch bore 35' into the cylinder, thereby moving the piston to the opposite end of the latter where it is latched by mechanism carried in sleeve 18a'.

Upon the pressure being relieved in conduit 14' after completion of this stroke of the piston, the latch returns under the influence of its spring 31' to its former position, check valve 38' allowing for the escape of fluid displaced by the latch during its movement.

The latching of the piston at the right hand end of the cylinder through engagement of the latch carried in the sleeve 18a' with face 59a of ring 61, takes place in the same manner as at the left hand end of the cylinder when the piston is moved in the opposite direction toward that end and will be understood from a description of the latter operation. Thus, during movement of the piston from right to left toward the position shown in Fig. 4, the fluid displaced by the piston escapes from the cylinder through bore 35' in the latch past check valve 38', and as face 12' on the end of sleeve 56 engages bevel 42' on the latch, the latter is raised and allows the end of the sleeve to pass under it until spring 31' can snap the latch to latching position back of face 59 of the sleeve, the fluid displaced from the cylinder by this movement of the latch also escaping through check valve 38', and the parts therefore again assume the illustrated position.

While we have herein described with considerable particularity certain embodiments of the invention which are especially adapted for fluid operation of mechanical elements of aircraft, being of lightweight construction, relatively simple and compact, and requiring no special attention from the operator to insure positive latching and unlatching of the piston at the proper times during normal operation, it will be understood that we do not intend thereby to limit or confine ourselves thereto in any way, as numerous changes and modifications in the form, construction, arrangement and method of assembly of the several parts will readily occur to those skilled in the art and may be made if desired without departing from the spirit and scope of the invention as defined in the appended claims.

Having thus described our invention, we claim and desire to protect by Letters Patent of the United States:

1. In combination with a cylinder and a fluid actuated piston slidable therein and having a surface disposed substantially normal to the cylinder axis, a spring pressed latch disposed adjacent one limit of the piston travel, projectable into the cylinder to engage said piston surface and having a bore and a plurality of fluid passages communicating therewith, means providing a chamber proximate the latch, one of said fluid passages being adapted when the latch is in one position to interconnect through the chamber the adjacent end of the cylinder and a port communicating with a source of fluid pressure, and when the latch is in another position to interrupt said connection and means carried by the latch controlling another of said passages to inhibit the flow of fluid therethrough in one direction when the latch is in either of said positions.

2. In combination with a cylinder and a fluid actuated piston slidable therein and having a surface disposed substantially normal to the cylinder axis, a spring pressed latch adapted to engage said surface and thereby inhibit movement of the piston in the cylinder in one direction, a source of fluid under pressure interconnectible through a passage in the latch with the cylinder, means responsive to said fluid pressure for moving the latch out of engagement with said surface and adapted after said movement of the latch to admit fluid pressure into the cylinder between its adjacent end and the piston through said latch passage to move the piston toward the opposite end of the cylinder and means carried by the latch for permitting discharge of fluid from said adjacent end of the cylinder through another passage in the latch as the piston is moved in reverse direction toward said adjacent end.

3. In combination with a fluid cylinder and a fluid actuated piston slidable therein, a latch adapted to engage the piston comprising a body having a bore and spaced passages extending outwardly therefrom, and means supporting the latch for movement through an aperture in the cylinder wall into the path of the piston and forming a fluid-tight sliding joint with the latch, a source of fluid pressure connectible with said bore, fluid pressure responsive means for moving the latch out of the path of the piston to thereby admit fluid pressure to the cylinder through one of said passages and said bore, and fluid control means carried by the latch between said passages operative to obstruct communication therebetween during said movement of the latch.

4. In mechanism of the character described, a cylinder, a piston slidable therein, source of fluid pressure, a latch movable into the path of the piston to obstruct its sliding movement when substantially at one limit of its stroke, said latch having a primary fluid passage and a secondary fluid passage interconnected therewith and being responsive to fluid pressure to move out of the path of the piston and thereupon to interconnect said source through said primary passage with the cylinder between the adjacent end thereof and the piston, means adapted to move the latch into the path of the piston when said fluid pressure is relieved and means controlling the secondary passage to inhibit flow of fluid therethrough in one direction and to afford an outlet therethrough for fluid from the cylinder when the piston is moved toward the said limit of its stroke.

5. In mechanism of the character described, a piston latch comprising a body having a longitudinal bore and spaced fluid passages extending outwardly therefrom, fluid control means adapted to inhibit the flow of fluid through the bore between said passages in one direction, means for slidably supporting the latch, and forming therewith, a substantially fluid-tight seal, and having a fluid passage adjacent said seal adapted to communicate with one of the latch passages, fluid pressure responsive means for sliding the latch in one direction to thereby connect another of said latch passages with the passage in the support, and means for sliding it in the other direction to disconnect said passages.

6. Mechanism of the character described comprising a fluid cylinder, a piston slidable therein, a source of fluid under pressure, a latch movable into and out of the piston path adjacent one end of the cylinder adapted to engage the piston when proximate said end and inhibit its movement toward the other end, said latch having a plurality of passages, means for applying said fluid to the latch to move the latch away from said path and thereby establish communication from said source through one of said passages to that portion of the cylinder between its adjacent end and the piston to move the latter in one direction along said path and means carried by the latch controlling another of said passages for permitting escape therethrough of fluid from the cylinder when the piston is moved in the opposite direction.

7. Mechanism of the character described comprising a fluid cylinder, a piston slidable therein, a latch adjacent one end of the cylinder movable into and out of the path of the piston and adapted when in said path and the piston is adjacent said end to engage and thereby inhibit movement of the piston in one direction, a source of fluid under pressure interconnected with the cylinder, the latch being responsive to said fluid pressure and having a passage therein adapted to interconnect the fluid source with that portion of the cylinder between its adjacent end and the piston when the latch is moved substantially out of said path in response to said fluid pressure to thereby move the piston, and means controlling another passage in the latch adapted during said movement of the piston to inhibit flow of fluid through said last mentioned passage and during movement of the piston in the opposite direction to yield to said flow and thereby relieve the fluid pressure between the piston and said end of the cylinder.

8. In mechanism of the character described a cylinder, a piston slidable therein, a piston engaging latch supported from the cylinder and movable into and out of the path of the piston, said latch having a bore adapted to communicate with the interior of the cylinder and a plurality of passages extending from the bore, a source of fluid pressure, means cooperative with one of the passages adapted when the piston is in position to be engaged by the latch and the latch is out of the path of the piston to establish communication through said passage and bore between said source and that part of the cylinder between its adjacent end and the piston and to interrupt said communication when the latch is in the path of the piston and means interposed in another of the passages operative to inhibit flow of fluid therethrough while the fluid source and said part of the cylinder are connected.

9. In mechanism of the character described a cylinder, a piston slidable therein, means including a port interconnected with a source of fluid pressure, a piston engaging latch supported from the cylinder and movable into and out of the path of the piston, fluid pressure responsive means for moving the latch out of the path of the piston, said latch having a longitudinal bore communicating with the interior of the cylinder, a passage communicating with said bore adapted when the latch is out of the path of the piston but the piston is in position to be engaged thereby to interconnect the said port with the cylinder between its adjacent end and the piston and to interrupt said connection during reverse movement of the latch and another passage communicating with the bore adapted during said reverse movement of the latch to establish communication between the adjacent end of the cylinder and said port, and means for inhibiting flow of fluid from the port to said end of the cylinder through said last-mentioned passage.

10. In mechanism of the character described, a cylinder, a piston movable therein having spaced surfaces in fluid-tight relation with the cylinder wall and an annular groove between said surfaces, the cylinder having a port registering with said groove when the piston is at one end of its stroke, and latching means for the piston comprising a spring-pressed latch movable radially of the cylinder through an opening therein substantially axially aligned with the port and adapted to enter said groove, supporting means for the latch providing a bore in which the latch is axially slidable in fluid-tight relation with said means, and a fluid passage interconnecting the bore and the interior of the cylinder, the latch having a bore communicating directly with the cylinder and a fluid passage extending therefrom adapted to communicate indirectly with the cylinder through the passage in said supporting means when the latch is in one position and to be substantially sealed against such communication when the latch is in another position.

11. In mechanism of the character described, a cylinder, a piston movable axially therein in fluid-tight relation with the cylinder wall, an abutment carried by the piston, and latching means for the piston comprising a latch movable radially of the cylinder into and out of the path of the said abutment, supporting means for the latch providing a bore in which the latch is axially slidable in a fluid-tight relation with its wall, fluid responsive means carried by the latch for moving it in said bore in one direction, a source of fluid pressure interconnected with the latch supporting means, the latch having a bore communicating with the cylinder, and a passage connected therewith adapted when the latch is moved in one direction by said fluid responsive means to interconnect said fluid source with the cylinder, and yielding means urging the latch in the opposite direction to interrupt such interconnection.

CARL DE GANAHL.
WILSON L. SUTTON.